SYSTEM FOR HANDLING FOAMED PLASTIC

Original Filed Oct. 9, 1961 8 Sheets-Sheet 1

INVENTOR.
ANDREW T. KORNYLAK
BY
C. Chandlee Pidgeon
AGENT.

SYSTEM FOR HANDLING FOAMED PLASTIC
Original Filed Oct. 9, 1961 8 Sheets-Sheet 2
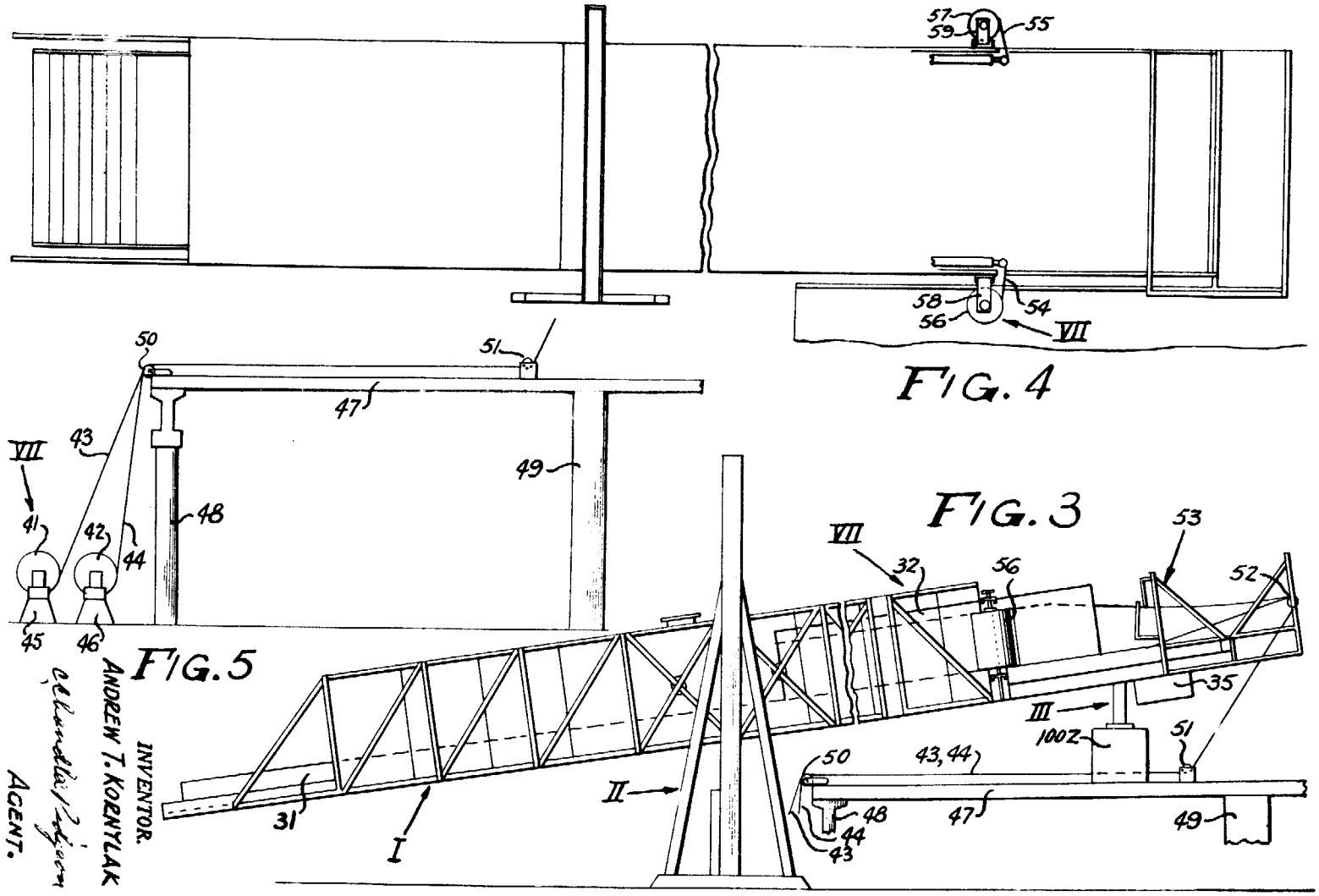

SYSTEM FOR HANDLING FOAMED PLASTIC

Original Filed Oct. 9, 1961 8 Sheets-Sheet 3

INVENTOR.
ANDREW T. KORNYLAK
BY
O. Chandler Pidgeon
AGENT.

SYSTEM FOR HANDLING FOAMED PLASTIC
Original Filed Oct. 9, 1961 8 Sheets-Sheet 4
FIG. 10
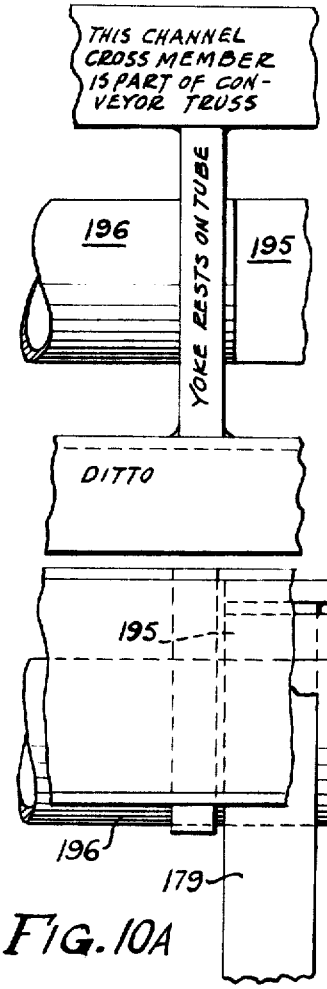
FIG. 10A
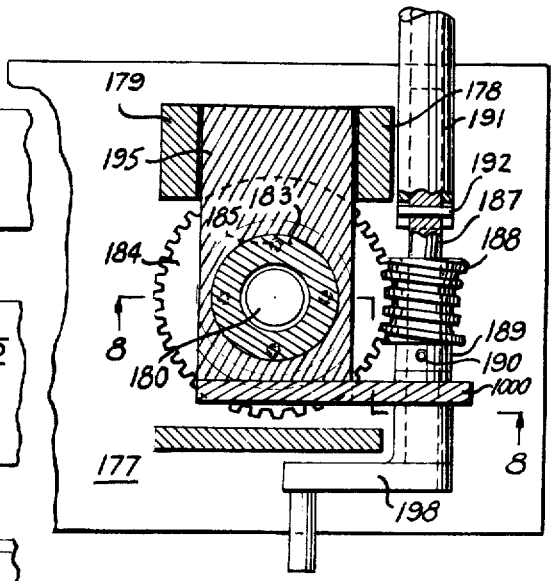
FIG. 9
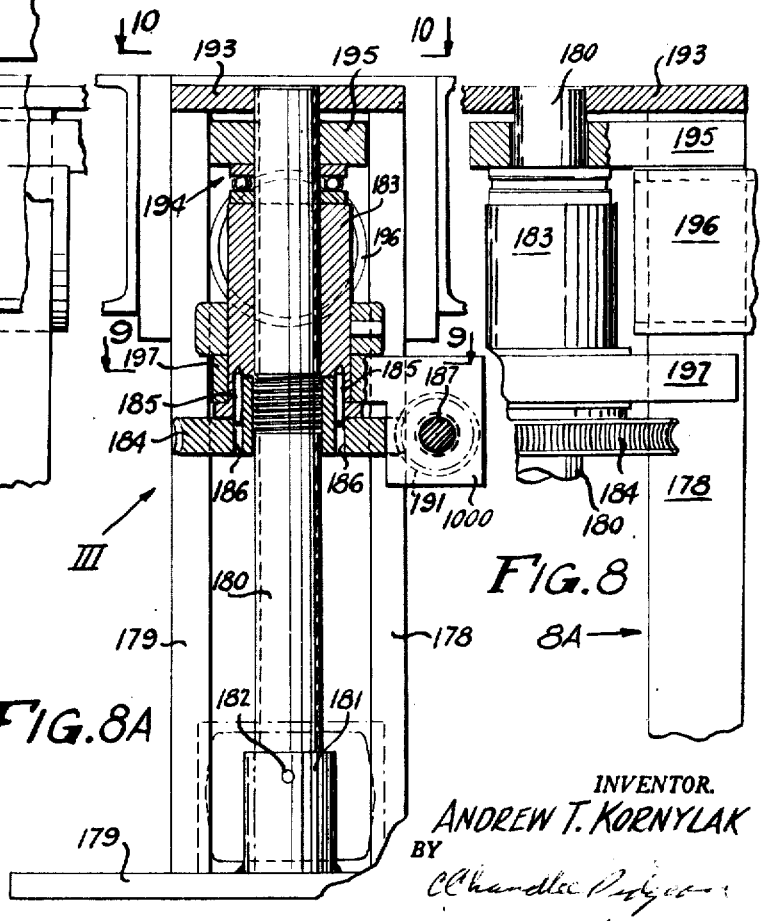
FIG. 8
FIG. 8A
INVENTOR.
ANDREW T. KORNYLAK
BY
C. Chandler Podgorski
AGENT.

SYSTEM FOR HANDLING FOAMED PLASTIC

Original Filed Oct. 9, 1961 8 Sheets-Sheet 5

INVENTOR.
ANDREW T. KORNYLAK
BY C. Chandlee Wright
AGENT.

SYSTEM FOR HANDLING FOAMED PLASTIC

Original Filed Oct. 9, 1961 8 Sheets-Sheet 6

INVENTOR.
ANDREW T. KORNYLAK
BY
C. Clandler Rodgers
AGENT.

SYSTEM FOR HANDLING FOAMED PLASTIC

Original Filed Oct. 9, 1961 8 Sheets-Sheet 7

INVENTOR.
ANDREW T. KORNYLAK
BY
C. C. Chandler Wilkerson
AGENT.

SYSTEM FOR HANDLING FOAMED PLASTIC
Original Filed Oct. 9, 1961 8 Sheets-Sheet 8
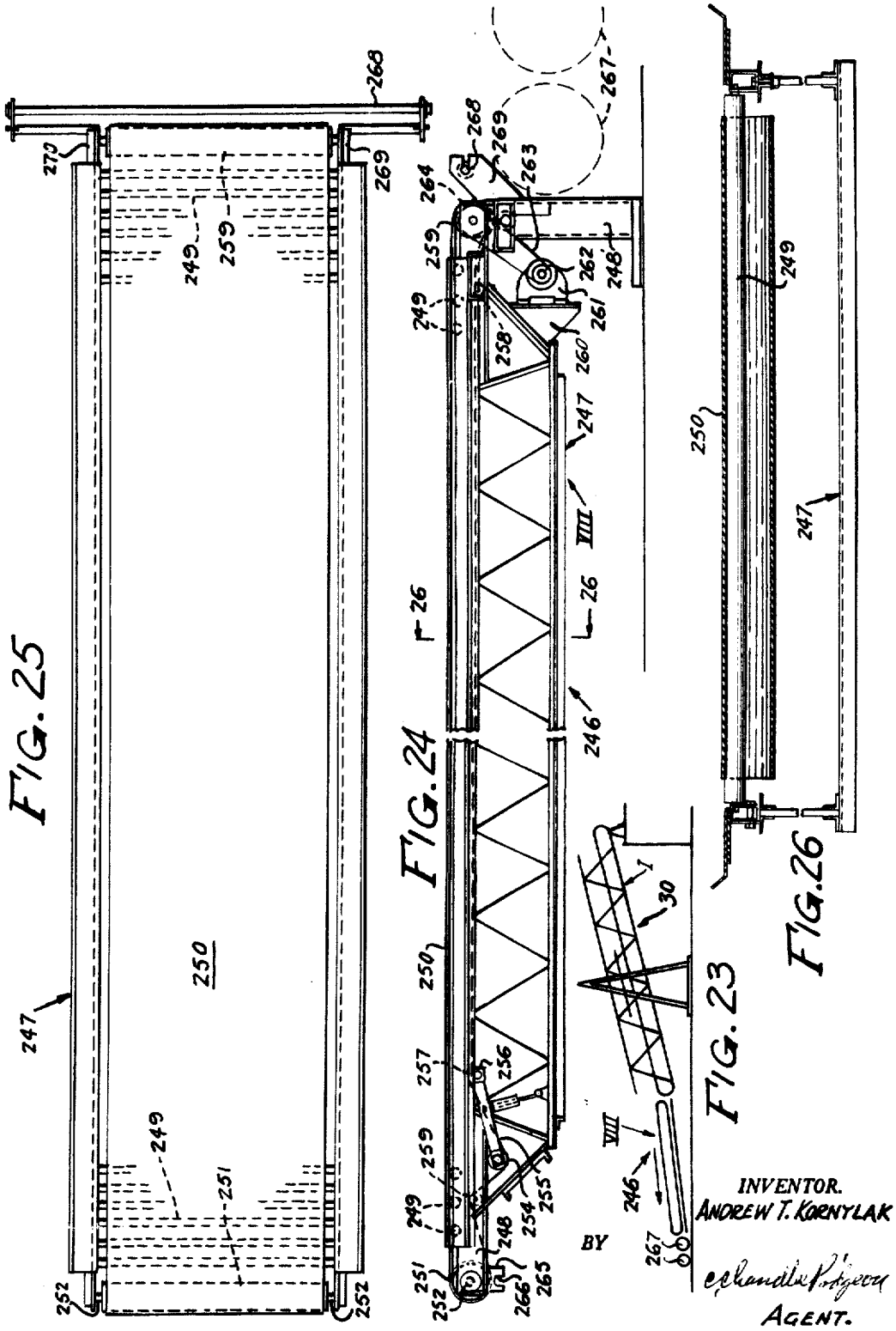

United States Patent Office

Re. 26,849
Reissued Apr. 7, 1970

26,849

SYSTEM FOR HANDLING FOAMED PLASTIC

Andrew T. Kornylak, Hamilton, Ohio, assignor to Kornylak Corporation, Hamilton, Ohio Original No. 3,093,232, dated June 11, 1963, Ser. No. 143,891, Oct. 9, 1961. Application for reissue May 20, 1965, Ser. No. 463,979

Int. Cl. B29b *5/00*

U.S. Cl. 18—4 23 Claims

Matter enclosed in heavy brackets [ ] appears in the original patent but forms no part of this reissue specification; matter printed in italics indicates the additions made by reissue.

This invention relates to a conveyor system for handling foamed plastic. Special use is made of a conveyor of the type shown in my copending application Serial Number 843,139 filed September 29, 1959, *now Patent Number 3,082,861, issued March 26, 1963.*

An object of this invention is the provision of a conveyor support having jack means at its receiving end to provide adjustment relative to the foam-supplying means.

Another object of this invention is the provision of jack means for adjusting the slope of the conveyor.

A further object of this invention is the provision of side fences longitudinally of the conveyor at either side thereof for confining the foam, at least one of the side fences being laterally adjustable.

An additional object of this invention is the provision of an overhead trolley means for adjusting a side fence.

A still further object of this invention is the provision of means for tilting at least one side fence.

Another object of this invention is the provision of means for supplying a paper liner to the conveyor means to prevent contact of the foam with the conveyor or the side fences.

Still another object of this invention is the provision of means for causing the paper initially to feed along the conveyor.

A still further object of this invention is the provision of a movable dam having means to hold the paper liner to the conveyor and to block movement of the forward end of a mass of foam relative to the conveyor.

Another object of this invention is the provision of means for rewinding the paper liner.

A further object of this invention is the provision of a receiving conveyor connected with the first conveyor.

An additional object of this invention is the provision of a suitable conveyor supporting truss which supports the metal slat belt conveyor, the fences, the fence adjusting means and the fence tilting means.

A still further object of this invention is the provision of conduits in or along the fences for heating or cooling fluids.

These and other objects will be apparent when considering the following specification taken with the accompanying drawings which taken together form a complete disclosure of my invention.

In the drawings, wherein like parts are represented by like characters of reference in the several views:

FIG. 3 is a somewhat diagrammatic showing of the conveyor of FIG. 1, showing the application of the paper liner;

FIG. 4 is a plan view of same;

FIG. 5 shows one means for supplying the paper liner;

FIG. 8 is a fragmentary end view partly in vertical section showing the jack for adjusting the receiving end of the main conveyor relative to the foam supplying nozzle;

FIG. 8A is a part vertical sectional view taken at 90° to that of FIG. 8 as shown by the arrow 8A;

FIG. 9 is a fragmentary top view taken on the line 9—9 of FIG. 8A, partly in section to show parts below the top of the jack;

FIG. 10 is a fragmentary view looking down on FIG. 8A as indicated by the line 10—10;

FIG. 10A is a fragmentary side view of the structure shown in FIG. 10;

FIG. 23 is a diagrammatic representation of my complete foam handling conveyor system;

FIG. 24 is a side elevation of the foam receiving conveyor showing the paper winding means;

FIG. 25 is a plan view with parts removed; and

FIG. 26 is a rear elevation of same.

Certain portions of the devices disclosed herein are given detailed treatment subsequently treated as sub assemblies I to VIII inclusive. The main conveyor truss is designated I. The jack for adjusting the slope of the conveyor is designated II. The jack for adjusting the head of the conveyor truss to position the conveyor properly with respect to the foam nozzle is designated III. The means for laterally adjusting the side fence is designated IV. The means for tilting a side fence is designated V. The dam and paper holding device is designated VI. The paper-supplying means is designated VII. The auxiliary or receiving conveyor and the paper take-up is designated VIII. While all the above mechanisms cooperate in the handling of foamed plastic, there is a certain element of independence as well as interdependence among them.

The system of this invention has been devised to handle foamed plastic such as urethane foam as delivered by a nozzle to a traveling conveyor upon which it solidifies in the form of a continuous "bun." For this purpose I provide the system I including a conveyor of the type shown in my copending *patent* [application Serial Number 843,139] above referred to.

Figure 2:
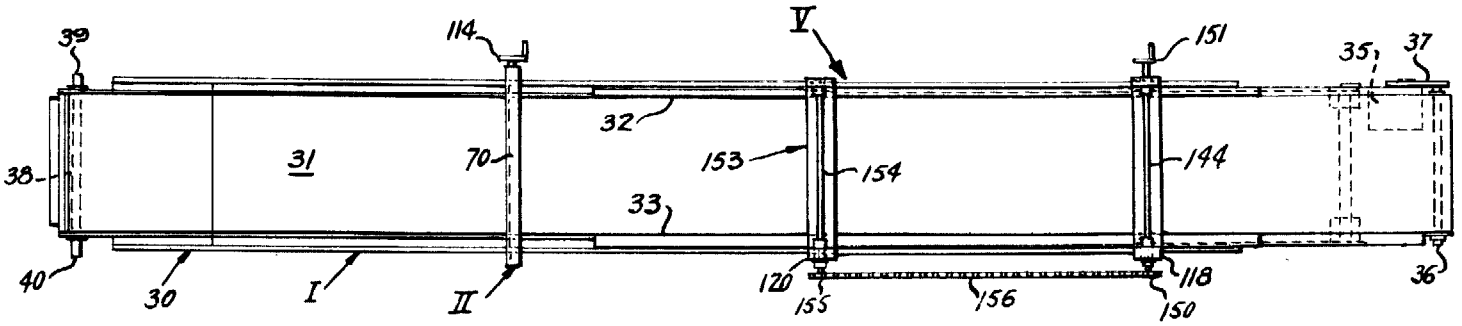
FIG. 2 is a diagrammatic plan view of same.
Figure 1:
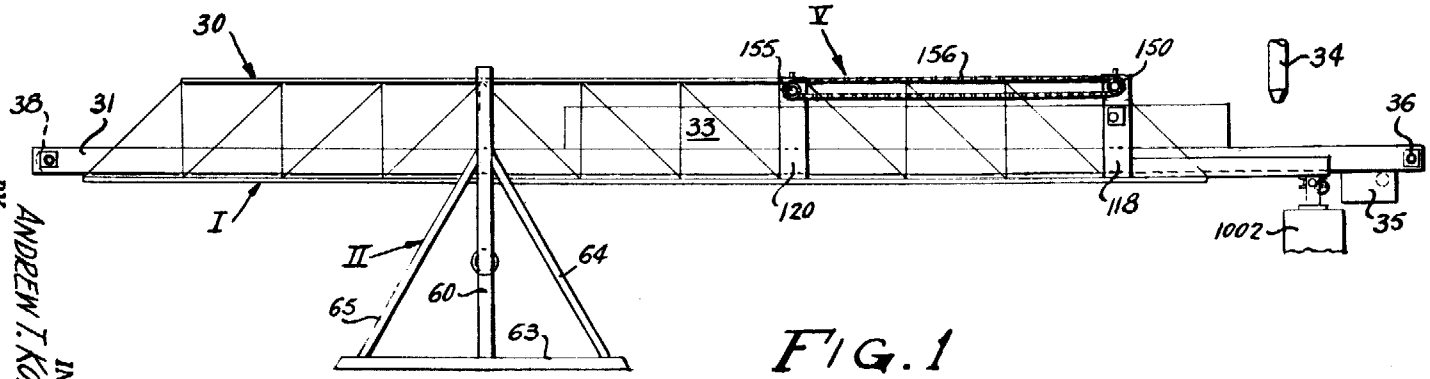
FIG. 1 is a diagrammatic side view of the main conveyor means of this invention.

Referring now to FIGS. 1 and 2, the system I includes a truss generally indicated at 30. Mounted in this truss is a conveyor 31. This conveyor 31 comprises a suitable frame and an endless belt composed of rectangular metal plates hinged together at their mating sides to form the top flight thereof into a substantially continuous plane surface as described in my prior application above referred to. This conveyor 31 is provided with side fences 32, 33 which are suspended from the truss 30 and are spaced slightly (about 3/16 inch clearance) from the upper flight of the conveyor, as will be apparent in FIG. 11. These fences are hollow for conducting heating or cooling fluid. The head end of the conveyor 31 is placed at a suitable distance from a nozzle 34 which travels back and forth across the conveyor to deposit liquid plastic on the upper flight of said conveyor. The liquid plastic contains the ingredients for causing it to expand or foam into a multicellular bun as it sets.

To facilitate precise adjustment of the head of the conveyor 31 relative to the nozzle 34, the jack means III has been provided and will be described in detail later on in this specification. A suitable motor is housed in the housing 35 and provides the power to operate the conveyor. The drive extends from the motor to the conveyor sprocket shaft 36 by means of a suitable belt 37. The conveyor return flight passes about suitable sprockets on the shaft 38 as will be apparent from a consideration of my prior application above referred to. The ends of the shaft 38 are extended axially as shown in FIG. 2 for reasons which will later appear.

In FIG. 3, the assembly I is shown in connection with means to supply a paper liner for the conveyor 31 and the side fences 32, 33 to prevent adherence of the plastic to these elements. One or more rolls, such as 41, 42, supply webs of paper 43, 44. The rolls 41, 42 are respectively supported on cradles 45 and 46. A mezzanine floor 47 having suitable legs, of which 48 and 49 are shown, supports feed rolls 50, 51, the webs passing over the roll 50 and under the roll 51. The webs then pass partly about the roll 52 on the folding frame 53. As these are many folding devices that may be suitable for this purpose, this means 53 is not described in detail. In the arrangement just described the webs 43 and 44 will be folded as in FIG. 14. In some instances the web 44 may be omitted and a sufficiently wide web 43' may be folded as in FIG. 13. In other cases a web 43'' may be substituted for the web 43 and two side webs 54, 55 may be supplied as shown in FIG. 4 from rolls 56 and 57 respectively mounted on suitable brackets 58 and 59 affixed to the truss 30. The paper liner thus formed will appear as in FIG. 15.

Figure 7:
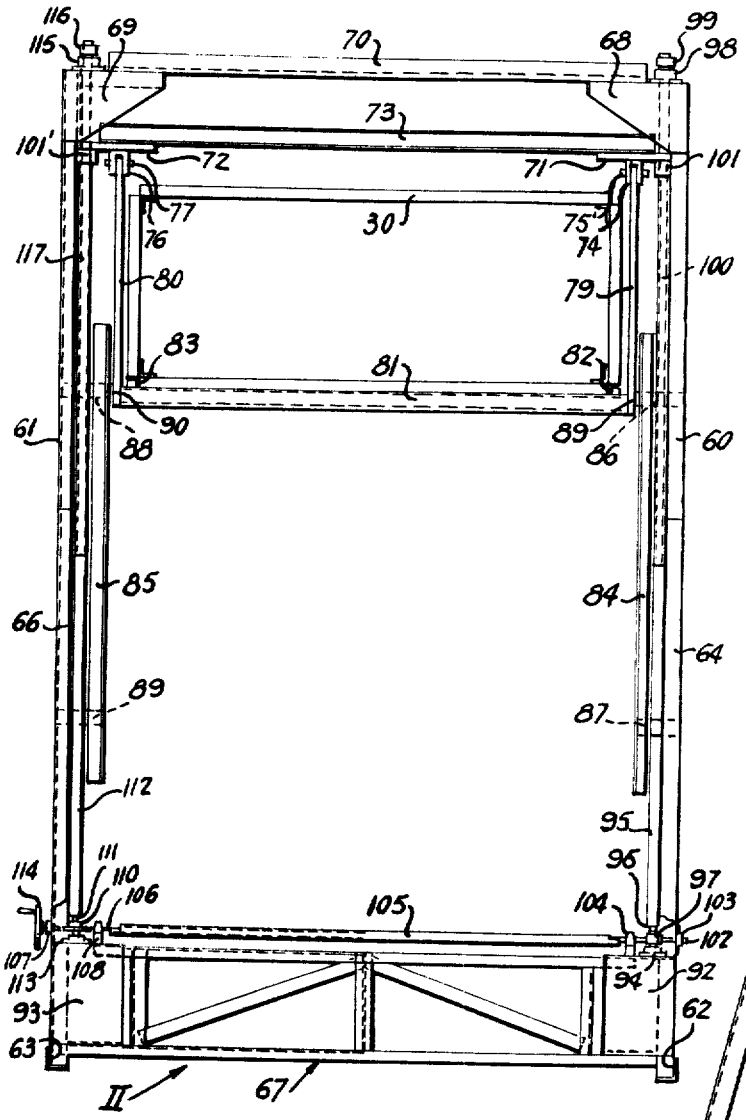
FIG. 7 is a front elevation of same showing the conveyor truss in position.
Figure 6:
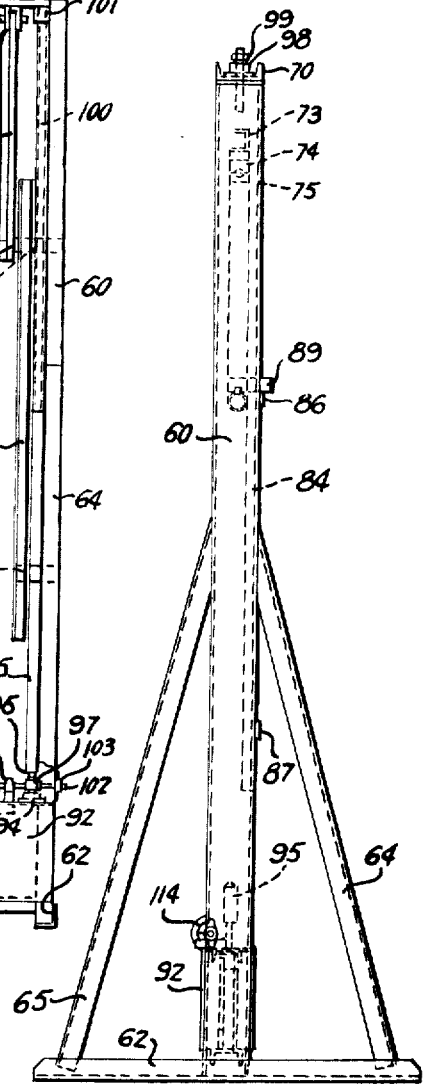
FIG. 6 is an end elevation of a jack for changing the slope of the conveyor.

Assembly II shown diagrammatically in FIGS. 1 to 4 is detailed in FIGS. 6 and 7. A pair of standards 60, 61 having feet 62, 63 and braces, those on standard 60 being 64 and 65; brace 66 only showing on standard 61 in FIG. 7. The standards 60, 61 are connected at their lower ends by a truss frame generally indicated as 67. The tops of the standards 60, 61 are respectively provided with angle brackets 68 and 69 which are connected by a cross bar 70. Further brackets 71, 72, mounted in a manner later to be described, are connected by a cross bar 73. A bifurcated lug 74 is mounted on the underside of the bracket 71 and is provided with an opening to receive a bearing pin 75. A bifurcated lug 76 is mounted on the underside of the bracket 72 and is provided with an opening to receive a bearing pin 77.

A trapeze arrangement 78 comprises a hanger bar 79 pivoted on the pin 75 and a second hanger bar 80 pivoted on the pin 77. The lower ends of the hanger bars 79 and 80 are connected by a tubular cross bar 81. The cross bar 81 is provided with a pair of upwardly projecting lugs 82, 83. A pair of guides 84, 85 are mounted on the standards 60, 61 by means of pairs of straps 86, 87 and 88, 89 respectively for the guides 84, 85. The trapeze is provided with a pair of guide plates 89, 90 respectively on the hanger bars 79 and 80. This arrangement allows the front end to assume various horizontally oriented positions as it is raised or lowered by means now to be described.

The truss member 67 includes box-like structures 92, 93. The box-like structure 92 supports a step bearing 94 for a jack screw 95. The shaft 95 has a reduced portion 96 on its lower end, on which is mounted a worm 97. The upper end of the shaft 95 passes through a bearing 98 mounted on the bracket 68. On the extreme upper end of the shaft 95, adjacent the bearing 98 there is a stop collar 99, suitably affixed to the shaft 95. A portion of the shaft 95, adjacent its upper end, is threaded as at 100, and engages a fixed nut 101 attached to the bracket 71.

The worm 97 on the shaft 95 engages a worm, not shown, on the shaft 102. The shaft 102 is mounted in a bearing 103 on the standard 64, and a second bearing 104 is mounted on the box-like structure 92. The shaft 102 extends into a coupling 105; the other end of the coupling 105 has a shaft 106 projecting therefrom which is mounted in a bearing 107 on the standard 66 and the bearing 108 on the box-like member 93. A worm 109 on the shaft 106 engages a worm 110 on the reduced end 111 of the shaft 112, which reduced end is mounted in a step bearing 113. The outer end of the shaft 106 is provided with a hand wheel 114. The upper end of the shaft 112 passes through a bearing 115 mounted on the bracket 69, and is provided with a stop collar 116 suitably attached thereto adajcent the bearing 115. A portion of the upper end of the shaft 112 is threaded as at 117, and passes through a stationary nut 101' mounted on the bracket 72. The structure of assembly II thus described provides for raising and lowering of the conveyor truss to change the inclination thereof, and permits accommodation of a fixed point on the truss to positions in different vertical planes as the truss is raised or lowered.

Figures 11, 12, 13, 14, 15:
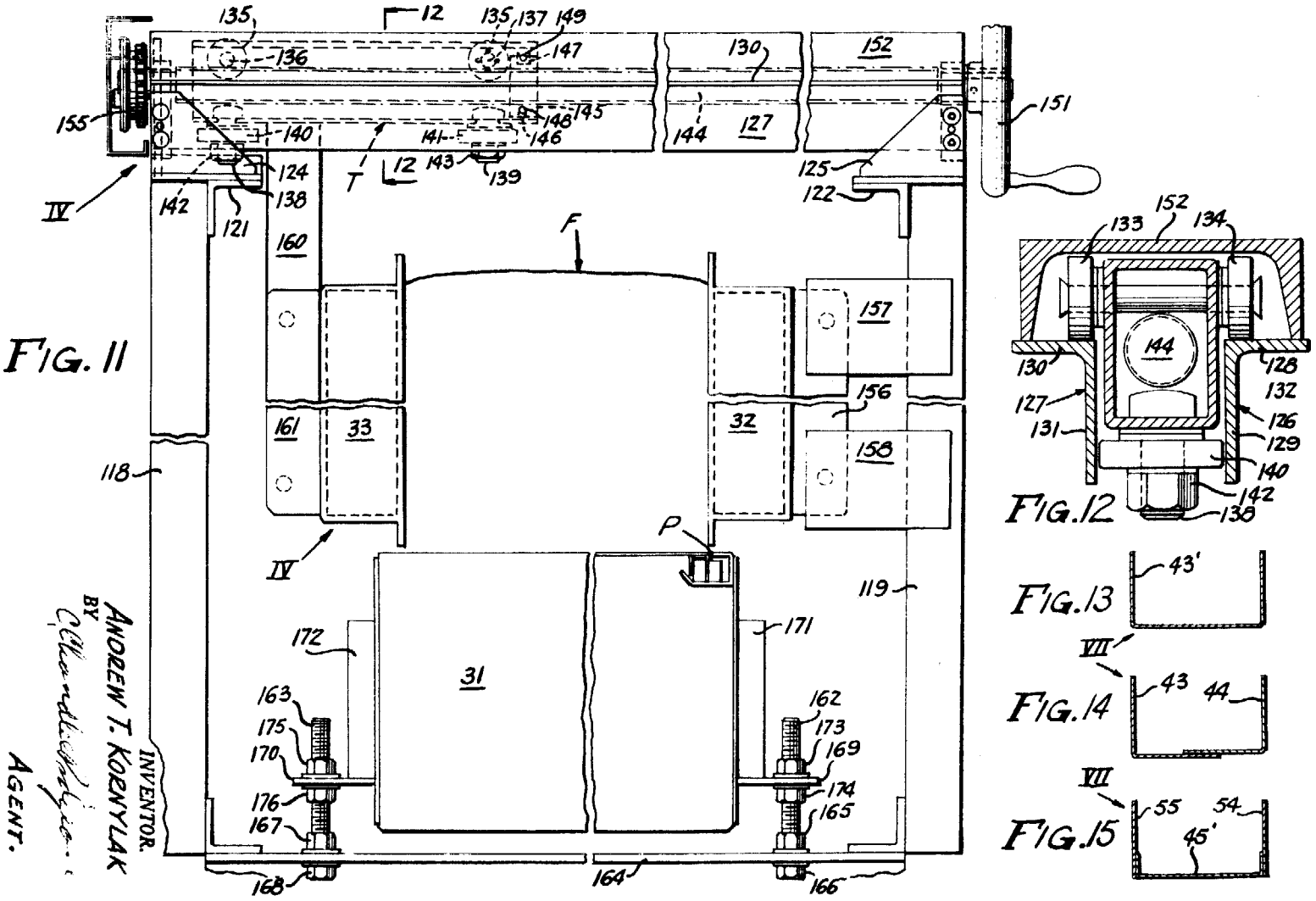
FIG. 11 is an elevation of the device of FIG. 1, at the receiving end thereof, with parts removed and other parts detailed.
FIG. 12 shows the trolley mounting for moving a fence laterally in a section on the line 12—12 of FIG. 11.
FIGS. 13, 14 and 15 represent sections of various forms of paper liner which may be used.

Assembly IV will now be described. This assembly is shown in FIGS. 11 and 12. Mounted on the truss member 30 are side members such as 118, 119 and 120. The two side members 118, 119 are connected by angle irons 121, 122, and these members support angle brackets 124 and 125. Angle beam 126 is mounted on the angle brackets 124 and 125 and extends across above the conveyor truss 30. A second pair of angle brackets, similar to 124 and 125 and similarly supported, supports angle beam 127, which is similar to angle beam 126, the two being allochirally arranged. Angle beam 126 has a horizontal flange 128 and a vertical flange 129, angle beam 127 has a horizontal flange 130 and a vertical flange 131. The flanges 128 and 129 form a trackway for a carriage or trolley T now to be described. A box-like member 132 extends longitudinally of the trackway and carries rollers 133, 134 and 135 as seen in FIGS. 11 and 12. The rollers 133 and 134 are mounted on a pin 136 extending transversely of the box-like member 132. The pin 137 forming a bearing for the roller 135 is provided at its opposite end with a similar roller, not shown, engaging the flange 130. A pair of bolts 138, 139 mounted in the bottom of the box-like member 132 form bearings respectively for rollers 140, 141, which are retained by nuts 142, 143, and engage the vertical flanges 129, and 131.

A screw shaft 144 extends longitudinally through the box-like member 132 and engages a nut 145 in the end of said member 132. This nut 145 is floatingly mounted by having grooves 146, 147 therein through which pins 148 and 149 respectively pass and engage suitable openings in the box-like member 132 to retain the nut 145 in position with freedom of movement. A sprocket 150 is mounted on one end of the screw shaft and a hand wheel 151 is mounted on the other end. A channel member 152 of substantially invetred U-shape has its sides resting on the flanges 128 and 130 to form a cover for the trackway.

There is a second adjusting system 153 mounted on the side member 120 and a companion member (not shown) on the opposite side of the truss. The structure of the trackways is identical as are the details of the carriage. There is no hand wheel corresponding to hand wheel 151, but there is a screw shaft 154 like the shaft 144 which operates in the same manner to move a trolley member like the one just described. A sprocket 155 is mounted on one end of the screw shaft 154 and a chain 156 connects this sprocket 155 with the sprocket 150.

A normally fixed side fence 32 is supported from the side frame member 119 by means of a pair of metal straps 157, 158 suitably fastened to the side frame member 119 and to suitable fins such as 159 on the fence. These plates or straps 158, 159 may be spot welded, riveted, or bolted as may be considered suitable. A bar or plate 160 is suitably attached to the carrier or trolley above described and is suitably attached to a fin 161 on the movable fence 33. By moving the carrier or trolley by the mechanism above described, including the hand wheel 151, the movable fence 33 may be adjusted to provide a suitable space between the two fences 32, 33 to accommodate the "bun" of foam F.

The fence 32 may also be mounted for lateral movement, as provided for the fence 33. In such a case an allochirally arranged trolley T would be provided at the opposite end of the screw shaft 144, and that end of the screw shaft will be threaded in the opposite manner from the threads for driving the trolley T as shown in FIG. 11.

The conveyor 31 is adjustably mounted in the truss 30 by means of bolts 162 and 163 which are mounted on a bottom truss bar 164 respectively by means of the pairs of nuts 65, 66 and 67, 68. Lugs 169 and 170 project respectively from conveyor frame members 171 and 172 and retain the conveyor in adjusted position by means of nuts 173 and 174 on the screw 162, and nuts 175 and 176 on the screw 163.

I shall now describe assembly III, comprising the means for adjusting the upper or pivot end of the conveyor 31 relative to the nozzle 34. This is accomplished by means of the assembly III, detailed in FIGS. 8, 8A, 9, 10 and 10A. There are two of these devices, mounted on pedestals such as 1002, one at either side of the conveyor truss 30, but as they are identical, except for allochiral arrangement, only one is shown and will be described. The assembly includes a base 177 and suitable uprights 178, 179. A threaded shaft 180 is fixed in a boss 181 by means of a pin 182. A nut 183 surrounds the shaft 180 and rotates relative thereto. The nut 183 is attached to a work gear 184 by means of pins 185 in openings 186 in the worm gear and suitable registering openings in the nut 183. A shaft 187 extends at right angles to the threaded shaft 180 and has a worm 188 thereon having a hub 189 through which a pin 190 passes to retain the worm 188 on the shaft 187. A coupling tube 191 is attached to the shaft 187 by means of a pin 192, and extends across under the conveyor to a shaft and worm similar to those just described.

The uprights 178, 179 are affixed to the base and are connected at the top by a plate 193. A thrust bearing 194 rests on top of the nut 183 and supports the cross bar 195. This cross bar 195 supports a bottom cross member on the frame of the conveyor 31. A tube 196 is affixed to the cross bar 195, and extends across under the conveyor. A guide member 197 embraces the lower end of the nut 183 and rides between the uprights 178, and its expansion 1000 carries the bearing for cross shaft 187, thus keeping the worm 188 in engagement as the gear 184 rides up or down. The jack is operated by means of a crank 198 which operates the shaft 187 and the worm 188.

Figure 16:
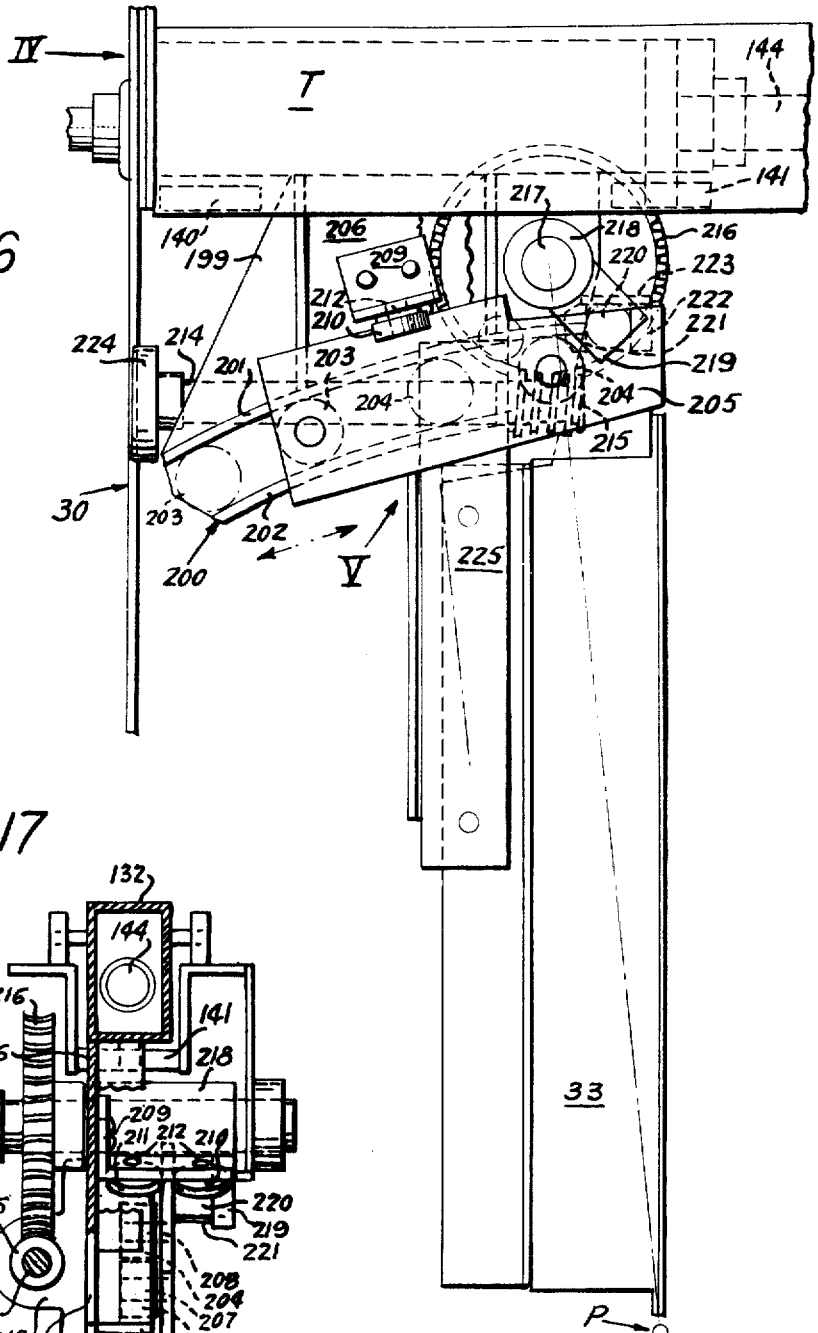
FIG. 16 shows the means for tilting a fence.
Figure 17:
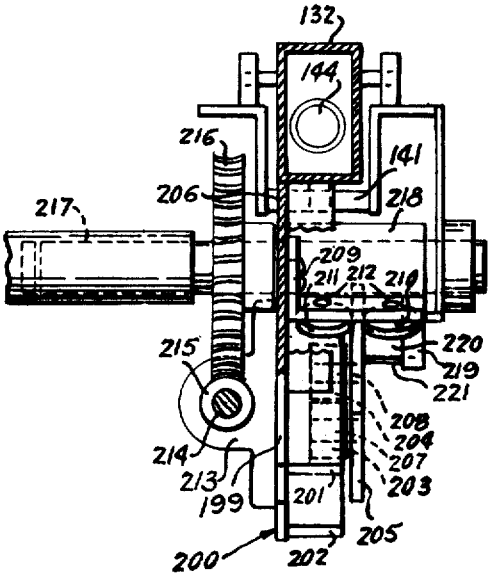
FIG. 17 is a fragmentary sectional view showing the relation of the two trolleys.
Figure 22:
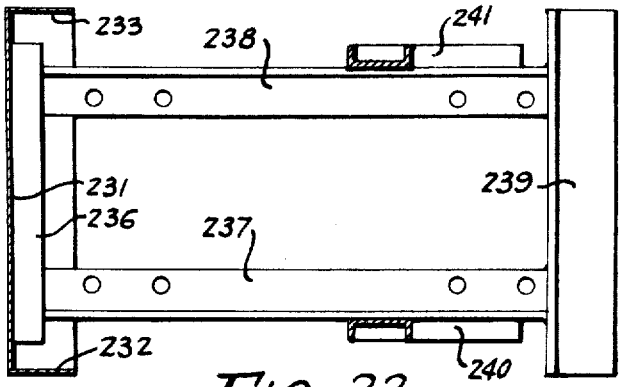
FIG. 22 is a plan view partly in section.

The tilt assembly V will now be described. This mechanism is illustrated in FIGS. 16 and 17. In FIG. 16, the carriage, or trolley T, is shown schematically as a portion of assembly IV of FIG. 11. There are usually two or more tilt devices along the length of the fence, but as they are similar, only one is described in detail. Others are provided as needed.

Also in lieu of a fixed fence 32, a tilting fence may be provided. It will be similar and have like tilting means as described for fence 33, except for allochiral arrangement. A bracket 199 is suitably affixed to the carriage or trolley T and supports an arcuate trackway 200. The trackway 200 has upper and lower flanges 201 and 202 respectively. The rollers 203 and 204 suitably supported on the trolley frame 205 ride between the flanges 201 and 202. A plate 206, affixed to the trolley T and the bracket 199 is provided with a flanged member 209 carrying rollers 210 and 211 mounted on pins such as 212. These rollers straddle trolley frome 205 to guide same in its travel.

To operate the tilt trolley 205, a shaft bracket 213 is mounted on the bracket 199 and supports a shaft 214 on which is mounted a worm 215. The worm 215 engages a worm gear 216 mounted on a shaft 217. The shaft 217 extends across the truss 30 to engage a tilting means like the one just described and affixed to a carriage mounted on the screw shaft 154 which is similar to the carriage or trolley T. A hub 218 mounted on the shaft 217 has a crank arm 219 provided with a rearwardly projecting pin 220 which engages between a pair of parallel lug plates 221 and 222 on the trolley frame 205, and which are connected by a bar 223. A hand wheel 224 is provided on the shaft 214 for operating same. A plate member 225 is suitably attached to the trolley frame 205 and to the side fence 33 so that the side fence 33 may pivot about the point P which is coincident with the inside face of the side fence 33 and the upper face of the conveyor 31.

The assembly No. VI will now be described. It is illustrated in FIGS. 18 to 22. Basically the device consists of a back plate 226 and a base 227. The base 227 is provided with a plurality of magnets 228 as shown schematically in FIGS. 18 and 19. A strip of paper such as 43 or 43'' rests on the surface of the conveyor 31. The magnets 228 clamp the paper to the metal slats of the conveyor belt so that the movement of the conveyor 31 feeds the paper therealong. A further liner 229 may cover the back plate 226 and extend under base 227. The back plate 226 comprises a shallow box 230 with a rearwardly facing bottom 231, sides 232 and 233 and ends 234 and 235. A channel bar 236 extends across a major portion of the bottom or back 231. The base consists of a pair of parallel angle irons 237 and 238, connected at one end to the box 230 and having their other ends connected by an angle iron 239. A pair of braces 240, 241 are respectively connected to the angle irons 237 and 238 to the cross bar 236.

The magnets 228 are mounted as follows: pairs of angles 242, 243 are mounted on the angle irons 237 and 238 by means of bolts 244. A bolt 245 passing through each pair of angles 242, 243 and a magnet 228 holds the magnet in place on the base 227.

Figure 18:
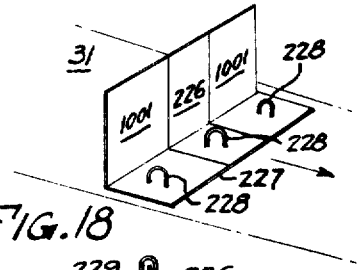
FIG. 18 is a diagrammatic perspective view of the dam and paper liner holding means.
Figure 19:
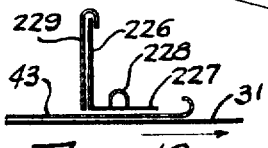
FIG. 19 is a vertical section through same.
Figure 20:
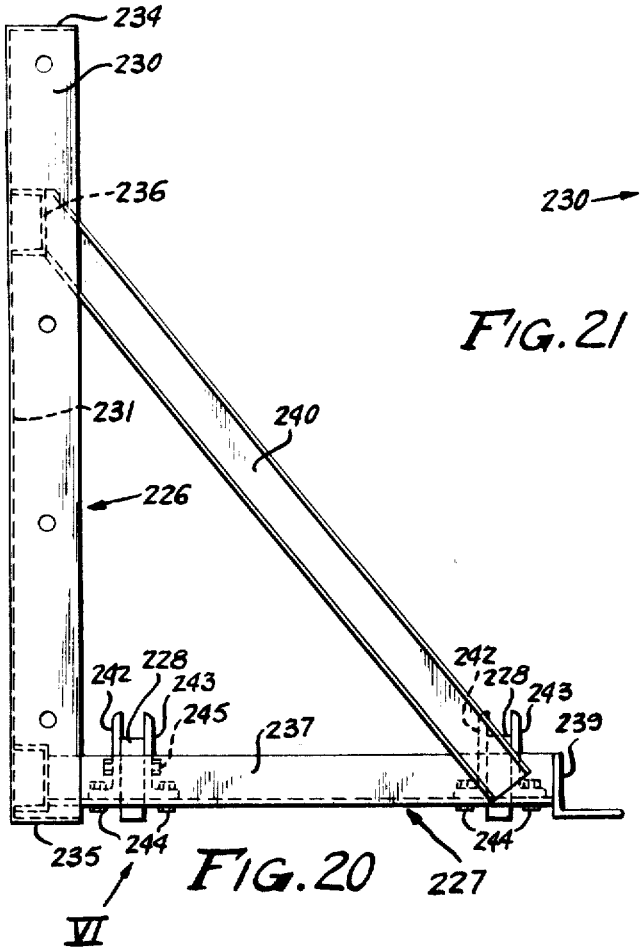
FIG. 20 is an end view of the structure used.
Figure 21:
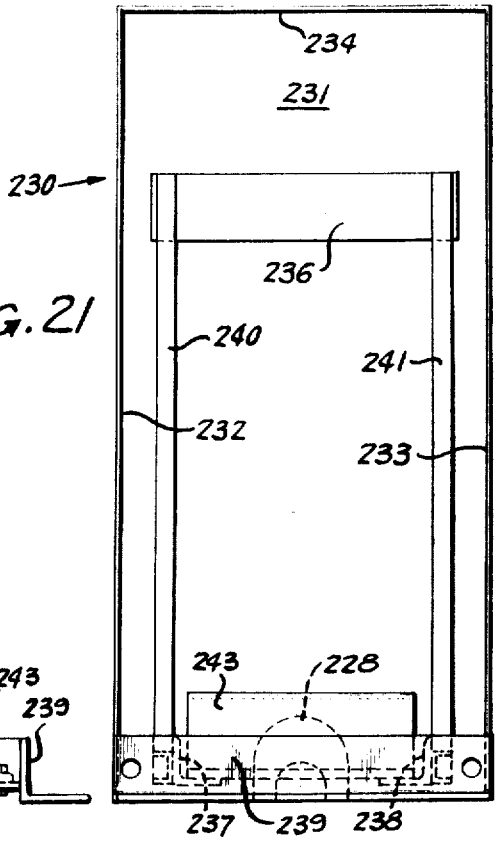
FIG. 21 is a front view of same.

The assembly VI may be adjusted to suit various widths of conveyor by adding filler pieces 1001 as shown diagrammatically in FIG. 18. The construction of such filler pieces will be substantially like that shown in FIGS. 20, 21 and 22.

Assembly VIII will now be described. It is shown in FIGS. 23 to 26 inclusive. FIG. 23 is a diagrammatic showing of a conveyor assembly 246 associated with the conveyor truss 30. The assembly 246 comprises a truss 247 supporting a conveyor frame 248. A plurality of closely spaced rollers 249 are rotatably mounted in the conveyor frame 248 and support the upper flight of the conveyor belt 250. A roller 251 having trunnions 252 is the turnback roller for the belt 250. Adjacent the roller 251 there is an idler roller 253 which support the lower reach of the belt 250. A tension roller 254 is rotatably mounted in a swinging frame 255 pivoted on the rod 256 mounted on the truss 247 and rests on the lower reach of the belt 250. A roller 257 is also mounted on the rod 256 and supports the lower reach of the belt 250. The belt 250 passes over the belt return roller 258 and then to the driven roller 259. A bracket 260 supports a suitable motor 261. The pulley 262 mounted on the drive shaft of the motor 261 drives a belt 263 which passes over a pulley 264 on the driven roller 259 to drive the conveyor belt 250.

The receiving end of the conveyor assembly 246 is provided with a pair of brackets, as 265, each having a notch 266 adapted to hook over the shaft ends 39 and 40 heretofore mentioned in connection with assembly I. Adjacent the discharge end of the conveyor belt 250 there is provided means to support and drive one or more take-up rolls 267 for receiving and winding the paper liner previously mentioned in connection with FIGS. 2, 4 and 5.

These sheets follow the conveyor 250 and a mass of foamed plastic thereon. The plastic is delivered to suitable means, not shown, for further processing or storage and the paper is taken up on the roll or rolls 267. As the means for supporting and driving these rolls 267 may be any desired conventional type, I have made no detailed disclosure thereof except to state that such means are provided. The paper leaving the conveyor 250 passes over guide roller 268, mounted on brackets 269 and 270, on the conveyor support 248.

The operation of the device should be apparent from the above, but the following summary is given to coordinate the several assemblies above described. A conveyor assembly is provided having a supporting truss 30 for a conveyor 31. Within the truss frame there are provided side fences 32 and 33 at least one of which is adjustable to predetermine the usable width of the conveyor for a particular condition. The conveyor 31 is of the interhinged slat type forming an endless belt. The adjustable fence 33 is moved transversely of the conveyor by a trolley or carrier T as shown in FIGS. 11 and 12.

Should it be desired to tilt the fence 33, a second trolley 205 traveling on an arcuate path on the trackway 200 is provided. This trackway 200 is affixed to the trolley T as shown in FIG. 16, and the center of curvature of the trackway is in the upper surface of the conveyor at a point where the inner face of the fence, if projected, would enter said conveyor surface.

A paper liner is provided as explained in connection with FIGS. 3, 4, 5, 13, 14 and 15. A dam and paper clamp as described in connection with FIGS. 18, 19, 20, 21 and 22 is applied to hold the paper in place. Foaming plastic is then supplied by the nozzle 34 and collects as shown by F in FIG. 11. As the plastic travels with the conveyor it expands or rises and solidifies. As the material reaches the conveyor 246, the dam is of no further utility and is removed. At the discharge end of the conveyor 246 the paper is rewound for reuse or disposal and the plastic is removed in a manner not shown.

The conveyor assembly I must be adjustable, so I provide the jack at the pivot end as shown in FIG. 1 and detailed in FIGS. 8, 8A, 9, 10 and 10A. This provides a fine adjustment for the receiving end of the conveyor 31 with relation to the nozzle 34.

The slope of the conveyor assembly I is adjustable by means of the jack or elevator assembly II as shown in FIGS. 1, 3, 6 and 7. As the conveyor assembly 246 is coupled to the discharge end of the conveyor assembly I, the assembly 246 will change inclination with any change of inclination of the conveyor assembly I. Means are also provided for adjusting the conveyor 31 relative to the truss 30, as best shown in FIG. 11.

Having now described my invention and its mode of operation, I desired it to be understood that modification may be made within the skill of the art and the scope of the appended claims.

I claim:

1. In a system for handling foamed plastic, a first endless belt type conveyor, a truss frame for supporting said first conveyor and means for adjustably supporting said truss frame, means for driving said first conveyor, a second endless belt conveyor adapted to receive material from said first conveyor, means for driving said conveyor, a pair of side fences supported on said truss frame and extending to a point in close proximity to the conveyor surface, at least one of said side fences being transversely adjustable relative to the first conveyor, means for supplying web material as a liner for said first conveyor and said side fences, means for holding said web material to the first conveyor, means for supplying foaming plastic in fluid form to the first conveyor, means adjacent the discharge end of the second conveyor to receive the web material therefrom.

2. The system as defined in claim 1, wherein the means for adjustably supporting the truss frame comprises jack means adjacent the receiving end of the conveyor mounted thereon for adjusting said receiving end relative to the means for supplying foaming plastic, and other means for adjusting the inclination of said first conveyor.

3. The system as defined in claim 2 wherein the jack means comprises a base member, a pair of screw jacks, means simultaneously operating said jacks, a plate connecting the screw shafts, said plate supporting the conveyor truss.

4. The system as defined in claim 2, wherein the means for adjusting the inclination of the conveyor comprises a vertically movable elevator having means for supporting the conveyor and means for vertically adjusting the elevator.

5. The system as defined in claim 4 including a base, a pair of upright standards, and wherein the means for supporting the conveyor includes a trapeze pivoted on the means for vertically adjusting the elevator.

6. The system as defined in claim 5 wherein the means for vertically adjusting the elevator comprises guide means mounted on the upright supports, a screw shaft adjacent each guide way, a nut at each side of the elevator adjacent the pivot point for the trapeze and in engagement with a screw shaft, and means simultaneously to rotate the screw shafts.

7. The system as defined in claim 6 including a horizontal shaft mounted on the base, a worm gear adjacent each end of the horizontal shaft, a worm at the lower end of each screw shaft, one in engagement with each worm gear.

8. The system as defined in claim 1, wherein the means for transversely adjusting the movable fence includes a trackway supported on the truss frame, a trolley movable on said trackway, means for supporting said movable fence from said trolley, and means for moving said trolley.

9. The system as defined in claim 8 wherein the trackway comprises a pair of angle irons, and wherein the carriage comprises a box-like member, rollers on said box-like member engaging said angle irons, a nut mounted at one end of the box-like member, a screw shaft extending parallel to said angle irons and through said nut and said box-like member, and means to rotate said shaft.

10. The system as defined in claim 9 including a second trolley mechanism attached to said movable fence, means connecting the two trolley mechanisms for simultaneous movement to move both ends of the fence.

11. The system as defined in claim 1 including means for adjustably supporting the first conveyor in the truss frame comprising screw jacks supported on the truss frame and adjustably connected to the conveyor frame.

12. The system as defined in claim 1 wherein the movable fence is tiltably mounted and wherein the tilting means is mounted on the means for transversely moving said movable fence.

13. The system as defined in claim 12 wherein the tilting means comprises at least one arcuate trackway, a carriage connected to the movable fence travelling on said arcuate trackway, and means for operating said carriage.

14. The system as defined in claim 13 wherein the means for operating said carriage comprises a worm mounted on said trackway, means for rotating said worm, a worm wheel on said trackway in engagement with said worm, crank means on said worm wheel and a roller on said carriage engaging said crank means.

15. The system as defined in claim 1 wherein the side fences are hollow to conduct heating or cooling fluid.

16. The system as defined in claim 1 wherein the means for supplying the web material liner to the first conveyor and fences comprises at least one supply roll of such web material, guiding means for said material and folding means to fold said web material longitudinally into substantially right-angled portions forming an angular U-shaped trough.

17. The system as defined in claim 1 wherein the means for receiving the web material from the second conveyor comprises at least one driven take-up roll, and means to guide the web material to such roll.

*18. In an apparatus for forming continuous urethane foam members including a conveyor, the improvement comprising feeding means mounted adjacent said conveyor for placing paper backing sheets on said conveyor, folding means mounted adjaecnt said conveyor for folding said paper backing sheets to provide side members, and additional feeding means for placing paper sheets at right angles to said backing sheets and contiguous with said side members.*

*19. In an apparatus for forming continuous urethane foam members including a conveyor and means for depositing liquid components thereupon, the improvement comprising a plurality of paper feeding means mounted adjacent said conveyor, means for placing a paper backing on said conveyor while forming right angle portions therein, guide means mounted above and at right angles to said conveyor, and means for placing additional paper members within said guide means and adjacent the right angle portions of said paper backing.*

*20. In a system for handling foamed plastics includcluding a longitudinally moving surface, stationary confining walls adjacent such surface and liner means for the moving surface and the side walls, and means for depositing liquid foamable material on said moving surface, the improvement comprising means supplying the liner means to the moving surface and the side walls which comprises means for advancing at least two webs of flexible material, folding means for forming such webs into a trough having side elements engaging the side walls and a bottom engaging the moving surface, said trough moving with the moving surface.*

*21. In a system for handling foamed plastics a trough for receiving foamed plastic, said trough having a longitudinally extending movable bottom, and means forming at least two webs of flexible material into trough form as a liner for said trough, to travel with said movable bottom.*

*22. In a system for handling foamed plastics as defined in claim 21 wherein the movable bottom comprises an endless conveyor.*

*23. In a system for handling foamed plastics as defined in claim 21 including supply means for said webs, folding means adjacent the receiving end of the trough for forming the webs into trough form, and rewind means for said webs adjacent the exit end of the trough.*

References Cited

The following references, cited by the Examiner, are of record in the patented file of this patent or the original patent.

UNITED STATES PATENTS

| | | | |
|---|---|---|---|
| 913,720 | 3/1909 | Gammeter | 18—6 |
| 1,391,805 | 9/1921 | Subers | 18—6 |
| 2,161,442 | 6/1939 | Wallace | 18—6 |
| 2,187,253 | 1/1940 | Wallace | 18—6 |
| 2,841,205 | 7/1958 | Bird. | |
| 3,091,811 | 6/1963 | Hackert | 18—4 X |
| 3,123,856 | 3/1964 | Dye et al. | 18—4 |

WILLIAM J. STEPHENSON, Primary Examiner